UNITED STATES PATENT OFFICE.

SUSAN STEVENS RAVENEL, OF WASHINGTON, DISTRICT OF COLUMBIA.

HEALTH FOOD.

1,303,724.     Specification of Letters Patent.     Patented May 13, 1919.

No Drawing.     Application filed June 20, 1918. Serial No. 241,024.

*To all whom it may concern:*

Be it known that I, SUSAN S. RAVENEL, citizen of the United States of America, residing at Washington, in the District of Columbia, have invented certain new and useful Improvements in a Health Food, of which the following is a specification.

This invention relates to improvements in health foods.

My invention comprises a food preparation in the form of flour which has distinctive characteristics, such that when the same is properly prepared and cooked for eating, it provides not only an extremely palatable and nourishing food, but one having a highly efficient dietary effect of great value as an aid to digestion and in the prevention of constipation and kindred alimentary troubles.

The primary object of the invention is to provide a composition of food ingredients, which when baked, or otherwise cooked, will produce a nutritious food product for convalescents.

The food composition possesses all the elements essential to augment digestion, and to act on the bowels, both highly important factors in the treatment of convalescents.

In addition to the foregoing the aim of the invention is to provide a combination of ingredients, each of which may be obtained at a reasonable cost and each of which possesses the salient characteristics necessary as a food product.

The composition is made of finely ground corn meal, wheat shorts, rice or similar flour, peanut flour, and senna meal, thoroughly intermixed to form flour. To illustrate the relative proportions best adapted for persons having weak stomachs, the following has been found most desirable;—

| | |
|---|---|
| Corn meal | 1 pound. |
| Wheat shorts | 1 pound. |
| Peanut flour or rice flour | One half pound. |
| Senna meal | 2 ounces. |

These ingredients are thoroughly intermixed to form a flour, and by adding water and yeast powder, or eggs and milk as desired, and then baked, a highly nutritious bread or biscuit is produced.

Bread baked from the flour produces a readily digestible food, the senna meal acting as a medicinal laxative, in addition to adding to the nutritive quality of the composition.

The various elements of the composition appear to coact, when baked, and form a food product which is palatable, digestible, and which, readily and gently acts on the bowels, hence making the product particularly adapted for convalescents, or others having weak digestive organs.

Bread made from the flour described has been, and is now being used in the treatment of patients, and is meeting with great success. The senna meal while used essentially as a medicinal laxative, could be substituted by another ingredient to accomplish this purpose, but from practical experience it has been found that this meal co-acts with the other ingredients employed to add to the digestive qualities of the flour. Consequently I prefer this meal since it serves the dual purpose, when mixed, to assist digestion, and assist the bowel action.

What I claim is:—

A food product for making bread consisting of corn meal, wheat shorts in equal proportions and forming the bulk of the product, a smaller proportion of peanut flour to supply oil to the product, and senna meal of considerably less proportion than the proportion of peanut flour which acts as a medicinal laxative to stimulate the bowels.

In testimony whereof I affix my signature.

SUSAN STEVENS RAVENEL.